Figure 1:
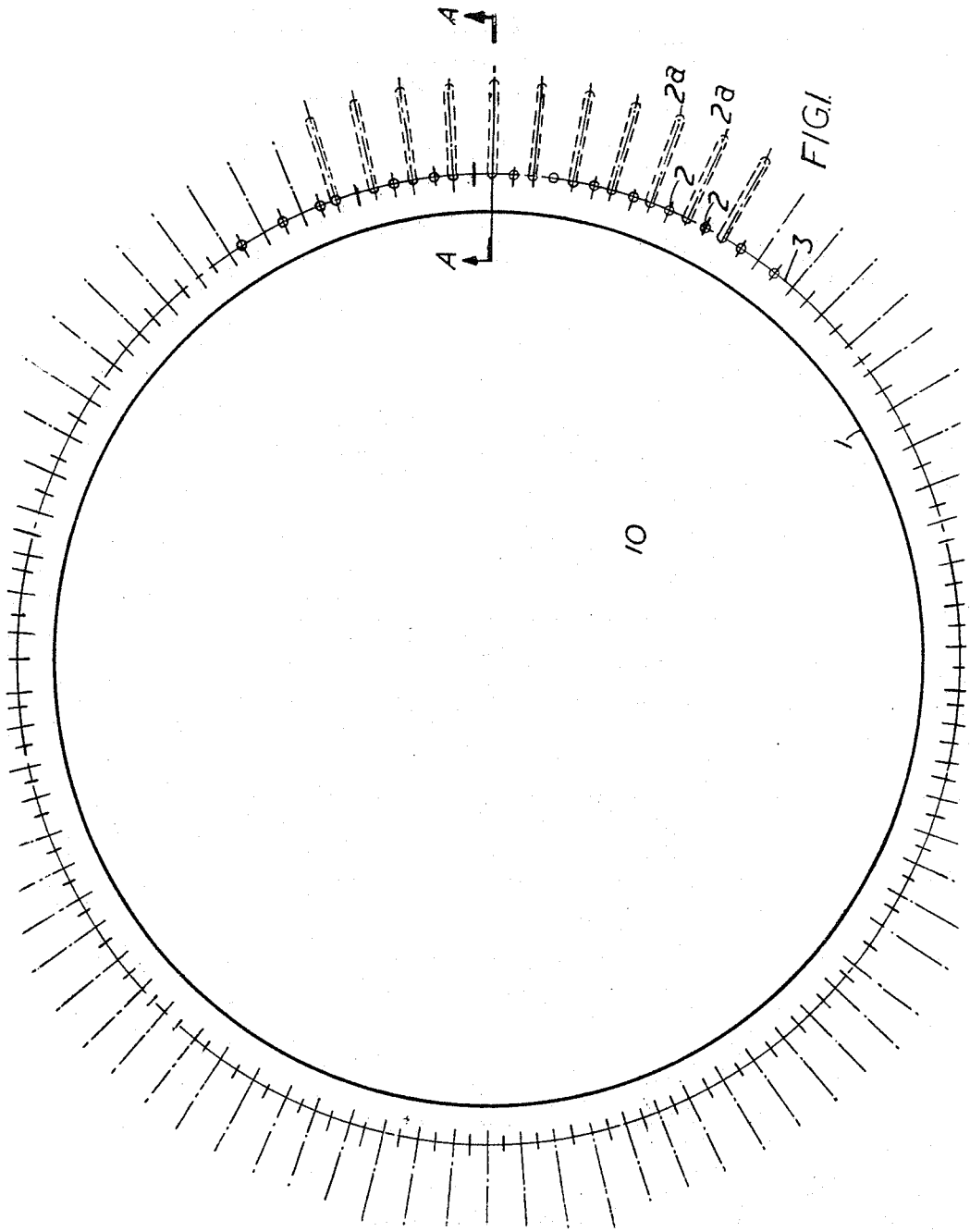

Aug. 23, 1966  E. M. SCHLUMBERGER  3,267,680
CONSTRUCTING A FROZEN WALL WITHIN THE GROUND
Filed July 15, 1963  2 Sheets-Sheet 1

Inventor
Etienne M. Schlumberger
By Max L. Libman
Attorney

Aug. 23, 1966  E. M. SCHLUMBERGER  3,267,680
CONSTRUCTING A FROZEN WALL WITHIN THE GROUND
Filed July 15, 1963  2 Sheets-Sheet 2
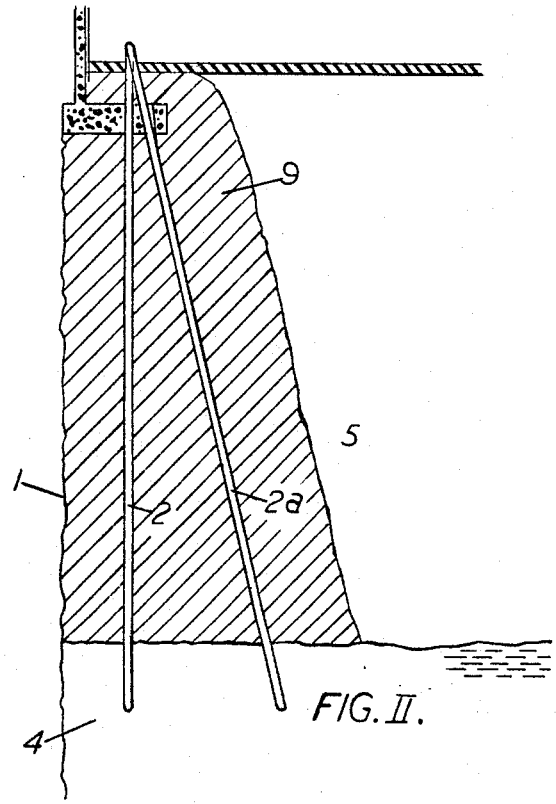
FIG. II.
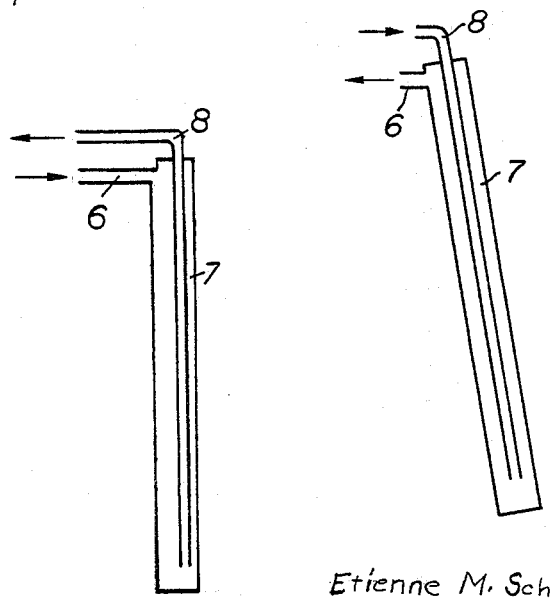
FIG. III.  FIG. IIIA.
Inventor
Etienne M. Schlumberger
By Max L. Libman
Attorney

United States Patent Office 3,267,680
Patented August 23, 1966

3,267,680
CONSTRUCTING A FROZEN WALL
WITHIN THE GROUND
Etienne Maurice Schlumberger, London, England,
assignor to Conch International Methane Limited,
Nassau, Bahamas, a company of the Bahamas
Filed July 15, 1963, Ser. No. 294,892
Claims priority, application Great Britain, Apr. 18, 1963,
15,244/63
7 Claims. (Cl. 61—36)

This invention relates to an improved method of freezing the ground.

The technique of freezing ground as an aid to excavation is well known to civil and mining engineers. It is used where excavation is necessary in water-bearing or unconsolidated strata or where additional strength is required for some other reason in the ground surrounding an excavation. It is used for example in constructing mine shafts, in which case the object is to form a continuous sheath of frozen strata around the proposed shaft. A recently proposed extension of this use was in connection with the construction of ground reservoirs for liquefied gases, in which case a continuous sheath of frozen strata is formed around the proposed reservoir prior to its excavation. The technique has also been used in the construction of foundations of buildings by producing a wall of frozen ground and then constructing the foundations under cover of this wall. This application is particularly valuable where subsidence must be avoided at all costs, for example, owing to the proximity of standing buildings.

The technique of freezing ground as presently practised involves boring a series of vertical holes about 6 in. in diameter and spaced about 3 ft. apart along the line of the desired frozen ground wall and to the desired depth. Considerable care is usually taken to bore the holes vertically. The bore holes are then lined with freeze pipes about 6 in. in diameter and sealed at the bottom. These freeze pipes are fitted with an open ended inner pipe going almost to the bottom of the outer pipe. Connections are then made from the tops of the freeze pipes to two circulation mains in such manner that a refrigerant can be pumped down the inner pipe and return along the annular space between the two pipes and hence back to a refrigeration plant. The refrigerants which have been used or proposed for this purpose include various brines, ammonia, propane, carbon dioxide and sulphur dioxide.

The circulating refrigerant removes heat from the strata around the freeze pipes and so forms cylinders of frozen ground, which cylinders eventually join up without any gaps to form a wall of frozen ground.

The strength of the frozen ground wall of the above type depends on inter alia its thickness and often to obtain the desired thickness two parallel sets of freeze pipes have had to be used. This involves the use of a large number of freeze pipes and considerably adds to the expense of the operation.

I have now found that the required number of freeze pipes to produce a frozen ground wall of given strength can be considerably reduced if the freeze pipes are arranged in a particular and novel manner. This manner involves inserting the freeze pipes in the ground along the line of the top of the desired wall, said freeze pipes being alternately vertical and at an angle of from 3–30° to the vertical.

Accordingly, the present invention provides a method for constructing a frozen wall within the ground which comprises inserting freeze pipes in the ground along the line of the top of the desired wall, said freeze pipes being alternately vertical and at an angle of from 3–30° to the vertical, and circulating a refrigerant through said freeze pipes until the frozen wall is complete.

In addition to the saving of freeze pipes necessary to produce a wall of given strength, the invention also gives a wall of maximum strength for a given amount of refrigeration used. This arises from the fact that the compression stress in a frozen wall in the ground is proportional to the depth below the surface, and therefore the thickness of the wall should increase with depth. This the present invention achieves.

The present invention also reduces the freezing time necessary to give a frozen wall of the desired strength, and it increases the concentration of freeze pipes near the surface of the ground which is that part of a construction subjected to most deterioration owing to the influx of heat from outside the ground.

As stated above, every other freeze pipe is inserted at an angle of from 3–30° to the vertical. The optimum angle for each case depends upon the temperature of the refrigerant, the nature of the ground and whether the desired frozen wall is to be a straight one or a curved one, and, if it is to be a curved one, the nature of the curve. For example, for a cylindrical excavation 115 ft. in diameter in very wet soils showing little cohesion an angle of 3° would be used if the refrigerant were at −90° C., an angle of 15° if the refrigerant were at −35° C. and an angle of 20° if the refrigerant were at −20° C. In most practical cases the optimum angle will lie somewhere between 5° and 20°.

At the surface, all the freeze pipes enter the ground on the line of the top of the desired wall. This may be a straight line where a straight wall is desired, for example in foundation work for building construction, a curved line, for example in dam construction or a complete circle, for example when constructing mine or lift shafts or storage reservoirs. The freeze pipes are preferably equally spaced one from the other along this line, the usual spacing being between 2 ft. and 4 ft. Any departure from equal spacing means a waste of refrigeration in producing the wall. Generally all the freeze pipes will go down to the same depth, but this is by no means necessary, and when working in some particular strata it may be desirable to use freeze pipes of different lengths.

Preferably the refrigerant inlet into those freeze pipes the bottoms of which are nearer to the intended excavation should be in the external annulus, thus giving the greatest cooling around these pipes near the top, and the refrigerant inlet into the remaining freeze pipes should be in the inner pipe, thus giving the greatest cooling around these pipes near the bottom. This arrangement gives optimum strength to the frozen wall.

A specific embodiment of the present invention will now be described with reference to the accompanying drawings, in which:

FIGURE I is a plan view of a ring of freeze pipes for producing a cylindrical ice-wall, FIGURE II is a section on the line A—A of FIGURE I after the ice-wall has been formed and the excavation made, FIGURE III is a section through a typical vertical freeze pipe, and FIGURE IIIA is a section through a typical inclined freeze pipe.

In the embodiment under consideration, it was desired to excavate a reservoir for the storage of liquefied gas, the vertical wall of which reservoir is indicated in FIGURES I and II by 1. The wall 1 is a cylinder 57 ft. 6 in. in radius. Before the reservoir is excavated 148 freeze pipes 2 and 2a are inserted in the ground on the circle 3 which is concentric with 1 and is 62 ft. 6 in. in radius. The freeze pipes are spaced from each other at a distance of approximately 2 ft. 8 in. and each alternate pipe 2 is inserted vertically, while each of the others 2a is inserted at 15° from the vertical sloping outwardly from the centre. The freeze pipes go down to a depth of 48 ft. into a rock stratum 4, the stratum above which is a clayey silt 5.

After the freeze pipes have been placed in position, they are connected up through circulating mains to a refrigeration plant (not shown in the drawings) capable of producing liquid propane at a temperature of −40° F. The connections to the mains are so arranged that in the case of the vertical freeze pipes 2, the cold propane at −40° F. from the refrigeration plant flows through pipe 6 into the annulus 7, and after taking heat from the surrounding ground leaves the freeze pipe via pipe 8. However, in the case of the sloping freeze pipes, the cold propane at −40° F. from the refrigeration plant enters the freeze pipe via pipe 8 and leaves it via the annulus 7 and pipe 6.

After the refrigerant has been circulated through the freeze pipes for a sufficient period to produce the desired frozen wall 9, the cavity 10 may be excavated. If in the above specific example all the freeze pipes were vertical, it would be necessary to obtain a wall of the same strength to use two concentric circles of freeze pipes with 100 pipes in each, i.e. it would be necessary to use a total of 200 pipes as compared with 148 used in the above example.

I claim:

1. A method for constructing a frozen wall for an excavation in the ground which comprises inserting freeze pipes into the ground along the line of the top of the desired wall, said freeze pipes being alternately vertical and at an angle of from 3° to 30° to the vertical with the tops of said freeze pipes being closer together than the bottoms, and circulating a refrigerant through said freeze pipes until the frozen wall is complete.

2. The method as claimed in claim 1, wherein the freeze pipes inserted at an angle to the vertical are inserted at an angle of between 5° and 20° to the vertical.

3. A method as claimed in claim 1, wherein the freeze pipes are equally spaced one from the other along the line of the top of the desired excavation, and the slope of the non-vertical pipes is downwardly and outwardly from said line.

4. A storage reservoir formed as a hole in the ground surrounded by a frozen wall, a ring of freeze pipes in said wall, means for circulating refrigerant fluid through said freeze pipes, said freeze pipes being alternately vertical and at an angle of from 3–30° to the vertical downwardly and outwardly from the top of the excavation.

5. A storage reservoir formed as a hole in the ground surrounded by a frozen wall, a ring of freeze pipes in said wall, means for circulating refrigerant fluid through said freeze pipes, the alternate ones of said freeze pipes being at an angle of from 3–30° to the vertical, the tops of said freeze pipes being closer together that the bottoms, so that the thickness of the frozen wall increases with depth.

6. The invention according to claim 5, said freeze pipes being of the type having an external annulus closed at the bottom and an inner pipe within said annulus coextensive therewith and open at the bottom, said annulus and pipe having each an opening at the top for the circulation of refrigerant fluid.

7. The invention according to claim 6, in which the circulation of refrigerant to the external surface of the annulus is from top to bottom in those freeze pipes which are nearer at bottom to the intended excavation and is from bottom to top in those freeze pipes which are further at bottom from the intended excavation.

References Cited by the Examiner

UNITED STATES PATENTS 713,165  11/1902  Sooysmith _____ 61—36.1

FOREIGN PATENTS 9,555  1901  Great Britain.

CHARLES E. O'CONNELL, *Primary Examiner.*

JACOB SHAPIRO, *Examiner.*